US007669225B2

(12) United States Patent
Peled et al.

(10) Patent No.: US 7,669,225 B2
(45) Date of Patent: Feb. 23, 2010

(54) APPARATUS AND METHOD FOR ASSURING COMPLIANCE WITH DISTRIBUTION AND USAGE POLICY

(75) Inventors: Ariel Peled, Even-Yehuda (IL); Guy Lupo, Tel Aviv (IL); Lidror Troyansky, Givataim (IL)

(73) Assignee: PortAuthority Technologies Inc., San Diego, CA (US)

( * ) Notice: Subject to any disclaimer, the term of this patent is extended or adjusted under 35 U.S.C. 154(b) by 903 days.

(21) Appl. No.: 10/839,147

(22) Filed: May 6, 2004

(65) Prior Publication Data

US 2004/0255147 A1 Dec. 16, 2004

Related U.S. Application Data

(60) Provisional application No. 60/468,084, filed on May 6, 2003.

(51) Int. Cl.
*H04L 29/02* (2006.01)
*H04L 29/10* (2006.01)

(52) U.S. Cl. .................... 726/1; 708/132; 709/231; 705/18; 726/6; 726/8

(58) Field of Classification Search .............. 726/1, 726/26, 30, 21; 708/132, 135; 705/18, 21, 705/39, 57; 709/231–232
See application file for complete search history.

(56) References Cited

U.S. PATENT DOCUMENTS 5,797,128 A * 8/1998 Birnbaum ................. 707/5
5,841,870 A * 11/1998 Fieres et al. ............. 713/156
7,428,750 B1 * 9/2008 Dunn et al. ................ 726/8
2002/0129140 A1 9/2002 Peled et al.
2002/0178249 A1 * 11/2002 Prabakaran et al. ....... 709/223
2003/0115313 A1 * 6/2003 Kanada et al. ............ 709/223
2003/0149732 A1 8/2003 Peled et al.
2003/0191834 A1 * 10/2003 Steegmans ................ 709/224
2004/0204949 A1 * 10/2004 Shaji et al. ................ 705/1

FOREIGN PATENT DOCUMENTS

WO   WO 03/038695    8/2003
WO   WO 2004/040464  5/2004

* cited by examiner

*Primary Examiner*—Jung Kim
*Assistant Examiner*—Venkat Perungavoor

(57) ABSTRACT

A method and apparatus for providing multi-domain control over a digital data item via a first domain security policy assigned to the digital data item at a first domain, the data item being transferred from the first domain to a second domain, the second domain being autonomous from the first domain in respect of security policies. The method comprises assigning the security policy to the digital item within the first domain; transferring the digital items to the second domain together with data defining the first domain security policy; analyzing the first domain security policy within the second domain; and distributing and/or allowing usage of the digital items within the second domain in accordance with analyzed first domain security policy, and/or reporting breaches or attempted breaches of the policy.

48 Claims, 6 Drawing Sheets

APPARATUS AND METHOD FOR ASSURING COMPLIANCE WITH DISTRIBUTION AND USAGE POLICY

CROSS-REFERENCE TO RELATED APPLICATIONS

This application is related to and claims priority from U.S. Provisional Patent Application No. 60/468,084, filed May 6, 2003, the contents of which are hereby incorporated herein by reference in their entirety.

FIELD OF THE INVENTION

The present invention relates to monitoring and enforcing a distribution policy with respect to digital items, more particularly but not exclusively to maintaining the distribution policy in cross-organization digital traffic.

BACKGROUND OF THE INVENTION

Modern businesses and industries rely heavily on the creation, storage and transportation of digital documents and other kinds of digital files as a primary means of communication, information storage, and documentation. In many cases, the digital documents and files contain proprietary and/or confidential material. It is therefore important to assign a distribution policy to each document that is distributed.

Enforcing the distribution policy for a given digital content within the perimeter of assigner of the policy can be accomplished, e.g., using the methods described in PCT application number IL02/00037. However, once the digital content was transferred to the perimeter of another organization, the situation becomes more complicated. In particular, the policy originally assigned to the content by the source organization may contradict or interfere with the organizational policy of the recipient organization.

Another important aspect of the problem is assurance that the policy assigned by the source organization has indeed been applied in the receiving organization with respect to the distributed content.

Prior art is based on cumbersome manual solutions to the problem or relies on automatic receipts. In many cases, automatic receipts contradict the receiving organization policy, and therefore maybe blocked, rendering receipt-based tracking useless.

There is thus a recognized need for, and it would be highly advantageous to have, a method and system that allows assurance of compliance with a distribution policy of digital items, which overcomes the drawbacks of current methods as described above.

SUMMARY OF THE INVENTION

The present invention seeks to provide a novel method and system for assurance of compliance with a pre-defined distribution and usage policy. Specifically, the current invention provides methods that allows for inter-organization communication and information sharing while not divulging anything on how the information is used in the receiving organization, part of assuring that the policy set by the source organization is adhered to.

According to a first aspect of the present invention, there is provided a method for cross-organizational policy enforcement. In a preferred embodiment of the present invention, the sender assigns a policy to a digital item that is to be sent to another organization. A reference monitor within the perimeter of the recipient organization receives the digital item and assigned policy. The reference monitor compares assigned policy with the policy of the recipient organization. If the distribution and/or usage policy complies with the local policy, distribution and/or usage is allowed. In other cases, the reference monitor can either block the distribution and can report to the sender the blocking and its reasons, or can negotiate with the sender new terms of the distribution and/or usage policy in order to comply with the local policy (e.g., adding or removing recipients)

The reference monitor can serve as single point-of-contact, thereby greatly simplifying the management overhead of inter-organization communication.

According to a second aspect of the present invention there is provided a method for providing multi-domain control over a digital data item via a first domain security policy assigned to the digital data item at a first domain, the data item being transferred from the first domain to a second domain, the second domain being autonomous from the first domain in respect of security policies, the method comprising:

assigning the security policy to the digital item within the first domain;

transferring the digital items to the second domain together with data defining the first domain security policy;

analyzing the first domain security policy within the second domain;

distributing or allowing usage of the digital items within the second domain in accordance with analyzed first domain security policy.

Preferably, analyzing the policy comprises assurance of the integrity of the policy and the content.

Preferably, assigning the first domain security policy to at least one digital item within the first domain comprises determining a legitimacy of at least one of the following:
  a set of authorized recipients;
  a set of authorized usages;
  a set of allowed formats;
  a set of allowed distribution channels, and
  a required action.

Preferably, the required action comprises at least one of the following:
  preventing distribution of the digital item;
  preventing storage of the digital item;
  preventing usage of the digital item;
  reporting distribution of the digital item;
  reporting storage of the digital item;
  reporting usage of the digital item;
  reporting;
  alerting about distribution of the digital item;
  alerting storage of the digital item;
  alerting usage of the digital item; alerting;
  logging distribution of the digital item;
  logging storage of the digital item;
  logging usage of the digital item;
  logging;
  notifying about distribution of the digital item;
  notifying about storage of the digital item;
  notifying about usage of the digital item;
  notifying;
  notifying to an administrator;
  notifying to a manager;
  notifying to a recipient;
  notifying to a sender;
  notifying to an owner of the digital item;
  quarantine;
  alerting an administrator;

alerting a manager;
alerting a recipient;
alerting a sender;
alerting an owner of the digital item;
reporting to an administrator;
reporting to a manager;
reporting to a recipient;
reporting to a sender;
reporting to an owner of the digital item;
encrypting the digital item;
changing the digital item;
replacing an information object with the digital data item; and
utilizing digital rights management technology on the digital item.

Preferably, applying the required action comprises blocking the transmission to unauthorized recipients.

The method may further comprise sending to the first domain a notification regarding the distribution of the digital item within the second domain.

Preferably, analyzing the policy within the second domain comprises comparing the policy assigned to the digital item within the first domain to the policy applied within the second domain.

Preferably, applying the policy within the second domain comprises either of a distribution policy and a usage policy.

The method further comprises assigning the policy based on information content of the digital item.

The method may further comprise monitoring the distribution or usage of the information content of the digital item within the second domain.

The method may further comprise enforcing a distribution or usage policy on the information content of the digital item within the second domain.

Preferably, the enforcing a distribution policy on the information content of the digital item within the second domain comprises enforcing a distribution policy with respect to the second domain email traffic.

The method may further comprise providing a negotiation stage of negotiating between the first domain and the second domain in case the first domain security policy assigned to the digital item at the first domain does not comply with policy rules that apply within the second domain.

The method may further comprise reporting of attempts of breaches of any of the policies.

The method may further comprise utilizing an arbitrator for resolutions of conflicts, arbitrator being independent of both the first domain and the second domain.

Preferably, arbitrator utilizes accumulated results of similar negotiations from the same or similar organizations as precedents and resolves the conflicts based on such precedents.

The method may further comprise utilizing an assurance authority for assuring the execution of the distribution policy, assurance authority being independent of the first domain and the second domain and comprising assurance functionality to render trust at both the first and the second domain.

Preferably, assurance functionality establishes trust between the first and second domain using a shared secret.

Preferably, the trust between the first and second domain is established using the public-key infrastructure.

The method may further comprise utilizing a trustee for auditing compliance of the second domain with the first domain security policy at the first domain.

According to a third aspect of the present invention there is provided a method for providing multi-domain monitoring over a digital data item, the data item being transferred from the first domain to a second domain, the second domain being autonomous from the first domain in respect of security policies, the security policy comprises requirements for breach reports, the method comprising:

assigning the security policy to the digital item within the first domain;

transferring the digital items to the second domain together with data defining the first domain security policy;

analyzing the first domain security policy within the second domain;

reporting about breaches or breach attempts within the second domain in accordance with analyzed first domain security policy and the breach report requirements.

Preferably, in a case in which the second domain does not accept a breach reporting requirements of the first domain, the distribution or usage of the digital within the second domain is prohibited.

Preferably, in a case in which the second domain does not accept a breach reporting requirements of the first domain, the distribution or usage of the digital within the second domain is restricted.

The method may comprise carrying out a negotiation between the first domain and the second domain in a case in which the breach reporting requirements assigned to the digital item at the first domain does not comply with the breach reporting requirements applied within the second domain.

Preferably, in a case in which the second domain does not accept the policy of the first domain, the distribution or usage of the digital within the second domain is prohibited.

Preferably, in a case in which the second domain does not accept a policy of the first domain, the distribution or usage of the digital within the second domain is restricted.

Preferably, the usage comprise comprises at least one of the following:
Storage;
Copying a file;
copying an excerpt;
editing;
copying to clipboard;
copying an excerpt to clipboard;
changing format;
changing encoding;
renaming a file;
encryption;
decryption;
changing digital management;
opening by an application; and
printing.

Preferably, the policy comprises placing a substantially imperceptible marking in the digital item, the marking comprising information content, and the method comprising placing the marking, when indicated by the policy, before allowing at least one of the following: storage of the digital item; usage of the digital item; and distribution of the digital item.

Preferably, the policy comprises distribution regulation, the distribution regulation being for regulating at least one of the following:
sending the digital item via mail;
sending the digital item via web mail;
uploading the digital item to a web server;
uploading the digital item to a FTP server;
sending the digital item via a file transfer application;
sending the digital item via an instant messaging application;
sending the digital item via a file transfer protocol; and
sending the digital item via an instant messaging protocol.

The policy may be dependent on at least one of the following:
- the domain of a respective digital item;
- the identity of a system;
- the identity of a user;
- the identity level of a user authorizing an action;
- the identity of a user requesting an action;
- the identity of a user involved in an action;
- the identity of a user receiving an digital item;
- authentication level of a system;
- authentication level of a user;
- authentication level of a user requesting an action;
- authentication level of a user authorizing an action;
- authentication level of a user involved in an action;
- authentication level of a user receiving the digital item;
- authentication level of a user sending the digital item;
- the format of an digital item instance;
- an interface being used;
- an application being used;
- encryption being used;
- digital rights management technology being used;
- detection of transformation, wherein the transformation is operable to reduce ability to identify the transformed digital item;
- digital item integrity;
- regular usage pattern;
- regular distribution pattern;
- regular storage pattern;
- information path;
- consistency of an action with usage pattern;
- the identity of a user overriding policy and authorizing action in respect to the digital item;
- authentication level of a user overriding policy and authorizing action in respect to the digital item;
- the identity of a user sending digital item;
- information property of the digital item;
- language of the digital item;
- representation of the digital item;
- operations done on of the digital item;
- identity of users involved along the life cycle of the digital item;
- application used on of the digital item;
- transition channel of the digital item;
- participant agents;
- virtual location of a computer;
- logical location of a computer;
- physical location of a computer;
- type of a computer;
- type of a laptop computer;
- type of a desktop computer;
- type of a server computer; and
- owner identity.

Preferably, analyzing comprises modifying the first domain security policy to encompass security policy rules of the second domain.

According to a fourth aspect of the present invention there is provided apparatus for providing multi-domain control over a digital data item via a first domain security policy assigned to the digital data item at a first domain, the data item being transferred from the first domain to a second domain, the second domain being autonomous from the first domain in respect of security policies, apparatus comprising:

a policy reference monitor, for assigning the security policy to the digital item within the first domain;

an assurance reference monitor for:
  receiving the digital items sent to the second domain together with data defining the first domain security policy;
  analyzing the data defining the first domain security policy,
  distributing or allowing usage of the digital items within the second domain in accordance with analyzed first domain security policy, and
  communicating with the policy reference monitor;

Apparatus may comprise an intra-organization reference monitor, and wherein policy reference monitor connects to the intra-organization reference monitor and checks whether the security policy assigned to the digital item complies with the policy applied within the second domain.

Apparatus may comprise an audit database for recording details of events in which a digital item, to which a distribution policy was assigned, was received by assurance reference monitor.

Apparatus may comprise an identification module which is operable to identify the information content of the digital item received by assurance reference monitor.

Apparatus may comprise an arbitrator which is operable to resolve conflicts between assigned policy and the policy applied within the second domain.

Apparatus may comprise an assurance entity which is operable to assures or certifies the execution of the security policy assigned to the digital item.

In a preferred embodiment of the present invention, the system allows for assurance of the integrity of the policy and the content, e.g., by using public-key infrastructure and/or digital signatures.

In a preferred embodiment of the present invention, the reference monitor of the recipient organization also provides an indication that assigned distribution and/or usage policy was indeed executed, and may report breaches and/or breach attempts or other information.

The present invention successfully addresses the shortcomings of the presently known configurations by providing a method and system for assuring the receiving organization's compliance with assigned distribution and/or usage policy, which can efficiently serve inter-organization communication.

BRIEF DESCRIPTION OF THE DRAWINGS

For a better understanding of the invention and to show how the same may be carried into effect, reference will be made, purely by way of example, to accompanying drawings.

In the drawings.

DETAILED DESCRIPTION OF PREFERRED EMBODIMENTS

Figure 1:
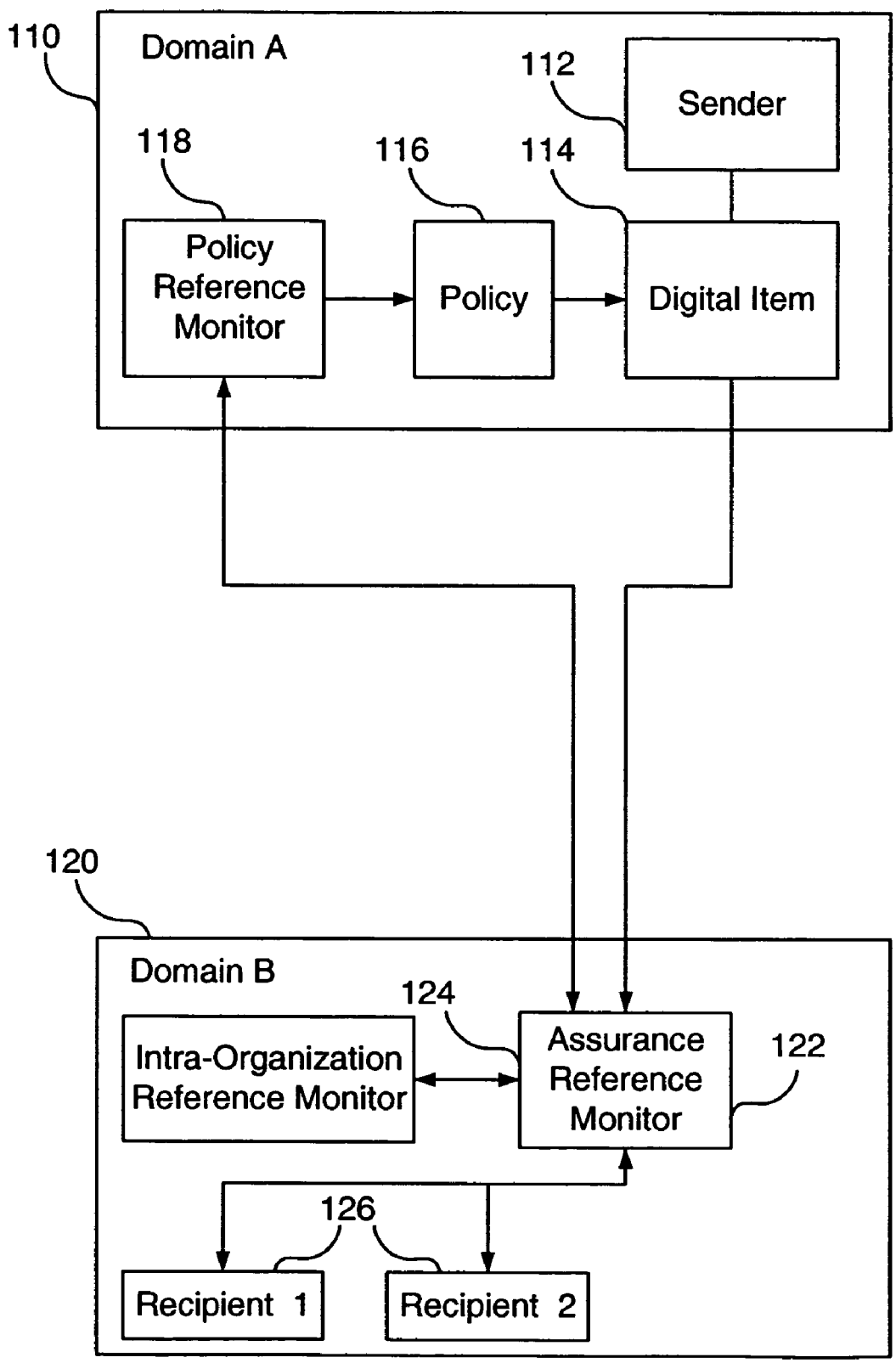
FIG. 1 is a simplified illustration showing a conceptual view of a system that allows for policy assurance, constructed and operative according to a preferred embodiment of the present invention.

The present embodiments deal, generally speaking, with monitoring and enforcing a distribution and/or usage policy with respect to digital items, more particularly but not exclusively to such monitoring and enforcement outside its original domain or perimeter.

Before explaining at least one embodiment of the invention in detail, it is to be understood that the invention is not limited in its application to the details of the construction and arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

According to a first aspect of the present invention, there is provided a method for cross-organization policy enforcement. In a preferred embodiment of the present invention, the sender assigns a policy to a digital item that is to be transferred to another organization. A reference monitor within the domain of the recipient organization receives the digital item, together with assigned policy. The reference monitor compares assigned policy with the policy of the recipient organization. If the sender's policy complies with the recipient's policy, distribution and/or usage is allowed. In other cases, the reference monitor can either block distribution and/or usage and report the sender or a trusted $3^{rd}$ party about the blocking and its reasons, or negotiate with the sender the terms of the new distribution and/or usage policy in order to comply with the recipients policy (e.g., adding or removing recipients). In a preferred embodiment of the present invention, the recipient creates a log for a blocking event.

In a preferred embodiment of the present invention, the required format for a breach report is transferred together with the distribution and usage policy.

The reference monitor preferably serves as a single point-of contact, and thereby greatly simplifies the management overhead of inter-organization communication.

Reference is firstly made to FIG. 1, which is a simplified illustration showing a conceptual view of a system that allows for policy assurance, constructed and operative according to a preferred embodiment of the present invention. A sender 112 within the domain 110 of organization A, sends the digital item 114, to which a policy 116 has been assigned by the policy reference monitor 118, to recipients within the perimeter 120 of organization B. Assurance reference monitor 122 operates as a gateway that receives digital items to which a policy was assigned. Assurance reference monitor 122 preferably connects to the Intra-organization reference monitor 124 and checks whether the policy assigned to the item complies with the policy applied within perimeter B. If it complies, assurance reference monitor address the item 114 to its recipients 126 and reports about it to the policy reference monitor 110 of perimeter A. In a preferred embodiment of the present invention, assurance reference monitor 122 verifies that the item indeed reaches its destination, e.g., by obtaining receipts from the recipients. In another preferred embodiment of the present invention, a read receipt, indicating that the recipient has at least accessed or opened the message, may also be provided.

In cases in which the local policy does not comply with the original policy, assurance reference monitor 124 may negotiate the policy of reference monitor of perimeter A 116 for an acceptable policy that would not contradict with the terms of the policy applied within perimeter B. For example, the original policy could restrict the distribution to certain recipients within organization B, while according to the policy applied in organization B, no recipient is allowed to receive a price-offer without the knowledge ("carbon copy"—CC) of the CFO. In this case, assurance reference monitor 122 asks the policy reference monitor 116 of organization A to include the CFO in the distribution list, and upon receiving approval, it distributes it to the updated distribution list. In cases in which automatic negotiation is not possible, the system may require manual approval in order to agree on changes to assigned distribution policy, such as adding or removing of recipients, changing the format of the digital item, applying a digital-rights management software on the digital item, etc. Automatic negotiation can be achieved e.g., if the reference monitor of the sender is allowed add or remove some recipients upon demand—e.g., to include top-tier managers in the recipients list if it is required.

A pre-requisite for the inter-operability of the reference monitors 118 and 122 is that the two of them would "speak the same language". This can be achieved, e.g., by requiring that the elements of the policy are represented as a tagged field using a markup language such as the Extensible Markup Language (XML).

In a preferred embodiment of the present invention, the reference monitor allows for assurance of the integrity of the policy and the content, e.g., by using public-key infrastructure and/or digital signatures.

Figure 2:
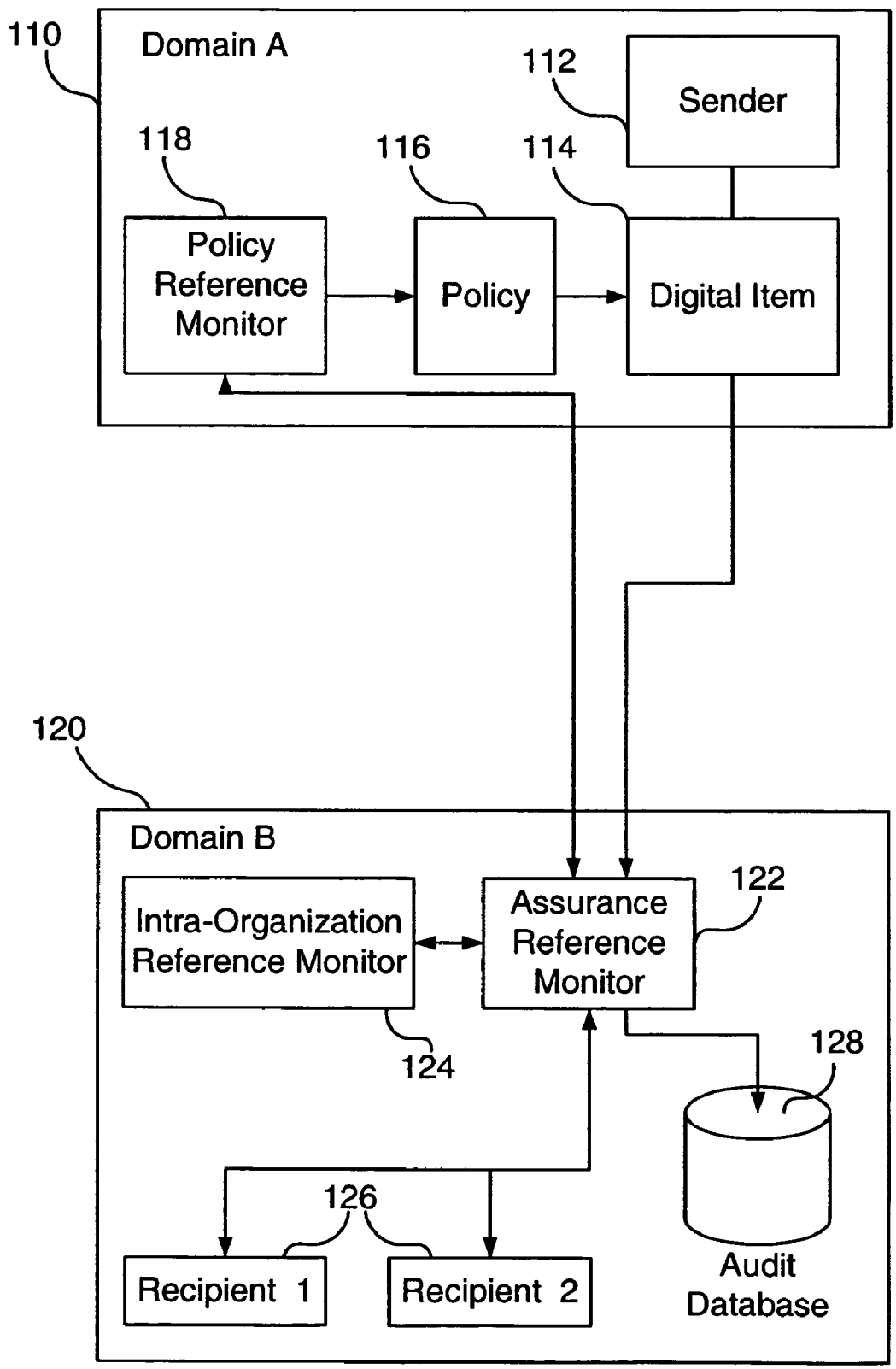
FIG. 2 illustrates a system similar to the one described in FIG. 1, which also include an audit database.

Reference is now made to FIG. 2, which illustrates a system similar to the one described in FIG. 1, which also include an audit database 128. In each case in which a digital item with an assigned policy was received, the system logs the details of the event, assigned policy, details of negotiations and resolutions, actions that were eventually taken etc.

Figure 3:
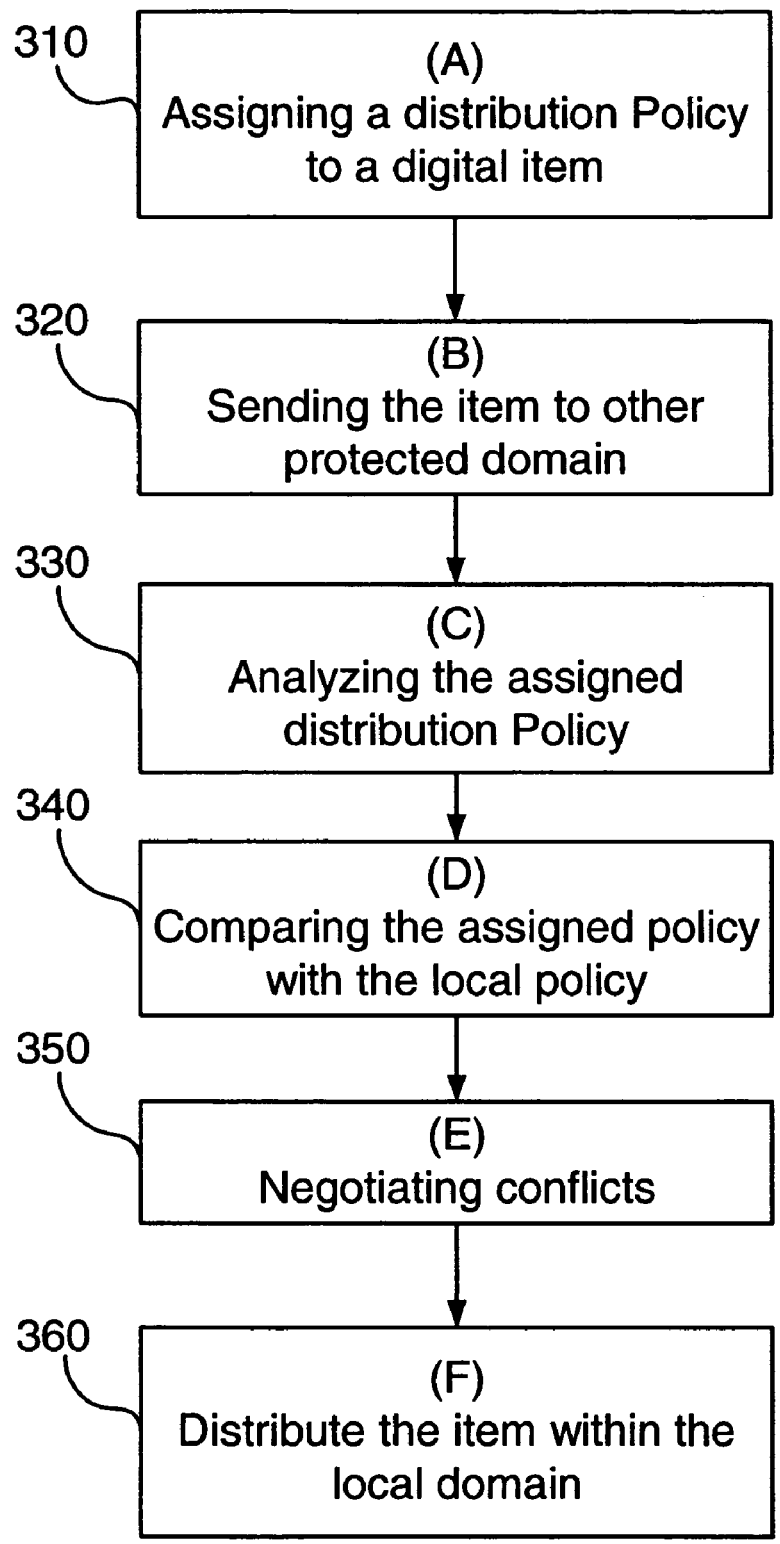
FIG. 3 is illustrates a flowchart of a method for policy assurance, constructed and operative according to a preferred embodiment of the present invention.

Turning now to FIG. 3, there is illustrated a flowchart of a method for policy assurance, constructed and operative according to a preferred embodiment of the present invention. At the first stage, a distribution policy is assigned to a digital item (stage A, indicated by 310). The digital item may be, e.g., a document, a digital audio or video file, digital images, drawings etc. The item is then sent to another protected perimeter (stage B, indicated by 320), e.g., to another organization or business or to another department within the original organization. After receiving the digital item and its assigned policy, assigned distribution and/or usage policy is then analyzed by an entity within the receiver's perimeter (stage C, indicated by 330) and is compared with the local policy within the receiver's perimeter (stage D, indicated by 340). In cases where there are conflicts between assigned policy and the local policy, the conflicting terms are preferably subjected to negotiations (stage E, indicated by 350), and if the conflicts are settled, the item is distributed within the receiver's perimeter (stage F, indicated by 360). In a preferred embodiment of the present invention, the reference monitor within the receiving domain starts the negotiation by pointing-out the discrepancies between the sent policy and the local policy, and offers the other side (the sender or the reference monitor or other authorized entity within the domain from which the digital item was sent) to modify the distribution policy in order to make it acceptable—e.g., by incorporating recipients (such as a representative of the legal department for legal documents such as contracts) or changing the format of the digital item. The sender in the other side can either agree to accept the suggested modification or replay with a counter-suggestion, based on distribution or usage policy, which may be less desirable to the sender. The negotiation continues until both sides agree upon the terms of distribution and/or usage and/or reporting. In a preferred embodiment of the present invention, each negotiator has at its disposal several policies with a different score, and both negotiators attempt to maximize the score of the expected policy. At each stage of the negotiation each side can suggest a less-preferred policy that is closer to the one suggested by the other side, until an acceptable policy is found.

Figure 4:
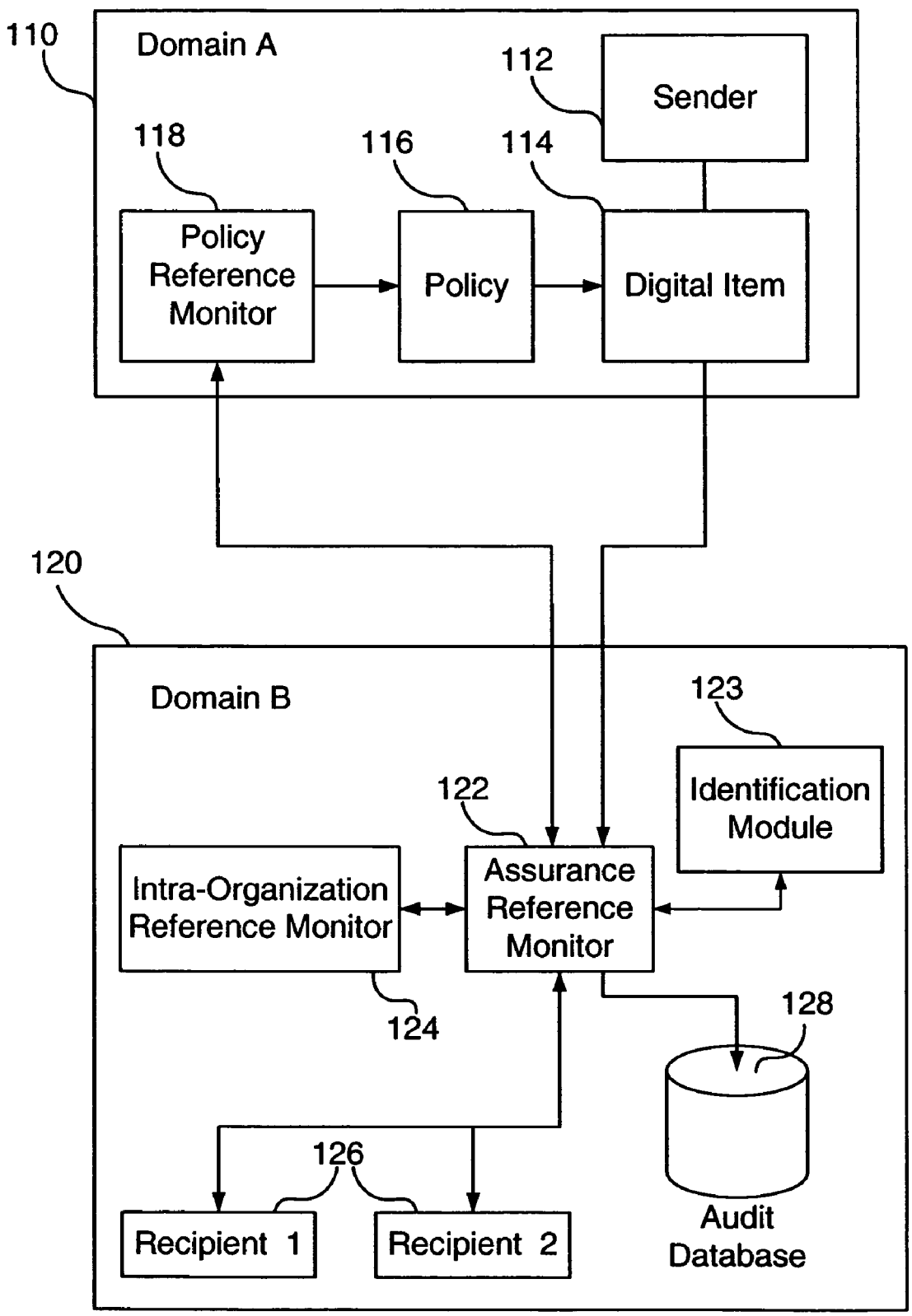
FIG. 4 illustrates a system, substantially similar to the one illustrated in FIGS. 1 and 2, which also contains a software module operable to identify digital content.

Turning now to FIG. 4, there is illustrated a system, substantially similar to the one illustrated in FIGS. 1 and 2, which also contains a software module 123 operable to identify content. The identification may be based on comparing some statistical characteristics of the inspected digital item with the statistical characteristics of digital items with which the system have previously been encountered or on other methods described in applicant's co-pending PCT patent application PCT/IL03/00889, U.S. Patent Application No. 20020129140, and U.S. application Ser. No. 10/357,201, the contents of which are hereby incorporated by reference. After identification, the system verifies whether a local policy is assigned either to the identified digital items or has a general effect over those items. In a case where there is such a local policy, the system compares assigned policy with the local policy, identifies possible contradictions and, in case in which such a contradiction was actually found, preferably negotiates with the sender or the reference monitor or other authorized entity within the domain from which the digital item was sent, in order to decide about the policy that should be assigned, as explained above.

Figure 5:
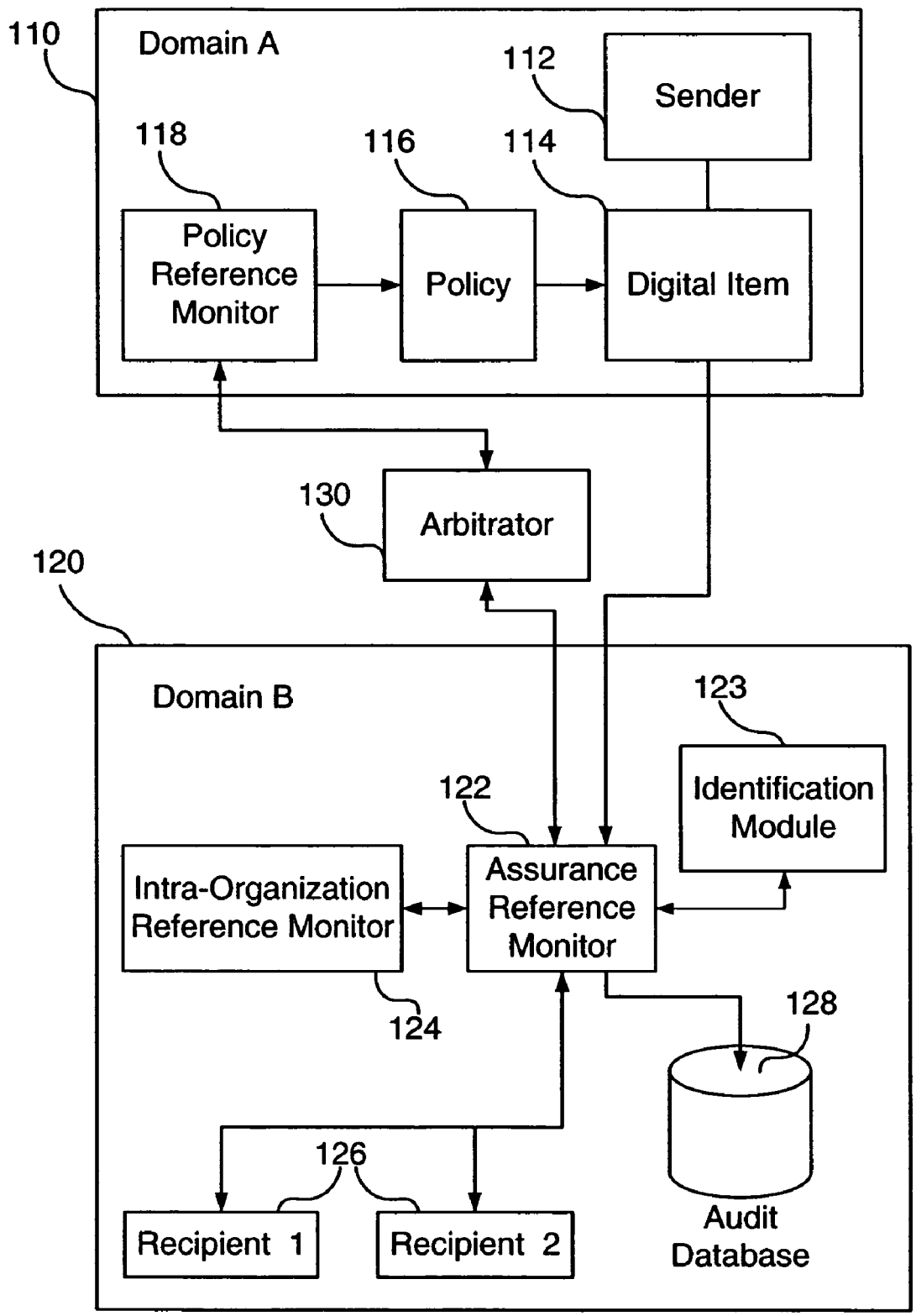
FIG. 5 illustrates a system, substantially similar to the systems illustrated in FIGS. 1,2 and 4, which also contains an arbitrator that facilitates the resolution of conflicts.

Turning now to FIG. 5, there is illustrated a system, substantially similar to the systems illustrated in FIGS. 1,2 and 4, which also contains an arbitrator 130 that facilitates the resolutions of conflicts. In a preferred embodiment of the present invention, each negotiator entrusts the relevant policies and their scores to arbitrator, and arbitrator attempts to find a policy that would maximize the minimal score of the expected policy. That is to say, the score that is assigned to the expected policy by the side which found accepted policy less desirable should be maximized. In a preferred embodiment of the present invention arbitrator uses accumulated results of similar negotiations from the same or other organizations as precedents, and resolves the issue based on such precedents. In another preferred embodiment of the present invention, arbitrator use methods such as these described in applicant's co-pending PCT patent application PCT/IL02/00268, the contents of which are hereby incorporated by reference.

Figure 6:
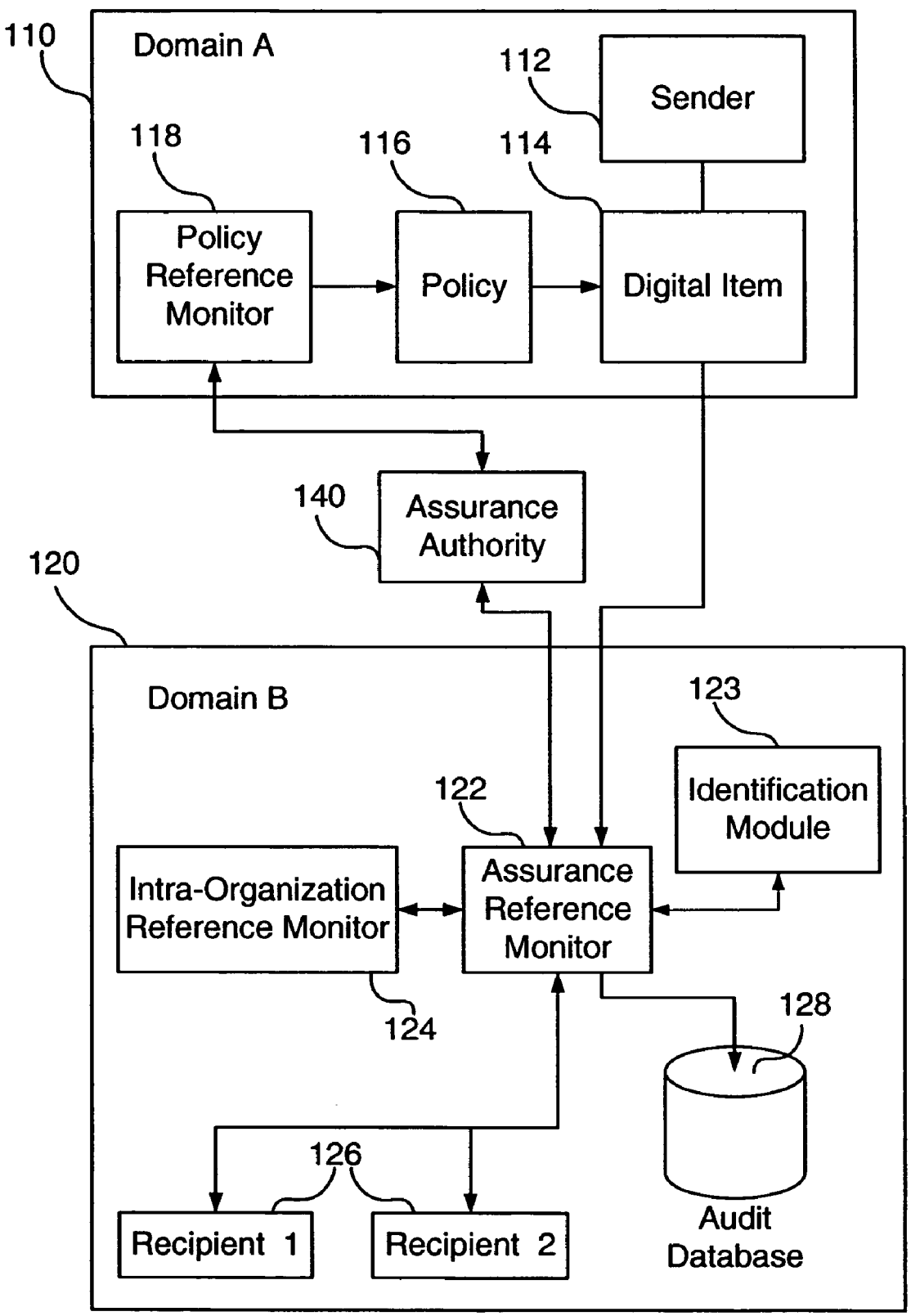
FIG. 6 illustrates a system, substantially similar to the systems illustrated in FIGS. 1,2 and 4, which also contains an assurance authority that assures and/or certifies the execution of the pre-defined policy.

Turning now to FIG. 6, there is illustrated a system, substantially similar to the systems illustrated in FIGS. 1,2 and 4, which also contains an assurance authority 140 that assures and/or certifies the execution of the pre-defined policy. In order to ensure that the distribution policy has indeed been executed, it may be necessary to trace the distribution routes or to obtain receipts from the recipients. In a preferred embodiment of the present invention, assurance entity obtains the receipts and provides a certification that assigned policy has indeed been executed based on the receipts, without sending the original receipts, thereby satisfying the sender's need for notification while maintaining control over the outgoing communication.

In a preferred embodiment of the present invention, the system also allows for hierarchical assurance and approval, that is to say reference monitors within the various sub-networks within the organization also check compliance with local policy (e.g., the policy of the financial or legal sections). These local reference monitors inform the main reference monitor about non-compliance, and request changes in the policy. The main reference monitor thereafter address the sender on behalf of the local reference monitors and preferably negotiates with it about a possible modification or relaxation, as explained above in the description of FIG. 4.

In a preferred embodiment of the present invention, trust between the two domains is established using a shared secret. In a preferred embodiment of the present invention the shared secret is established and managed via a digital-rights-managements (DRM) system, rights management services (RMS) or a public-key infrastructure (PKI).

In a preferred embodiment of the present invention, instead of sending the digital item, the item itself resides on a secure server, and a link to the item, together with access information, is transferred.

In a preferred embodiment of the present invention, the security policy comprises determining the legitimacy of at least one of the following: a set of authorized recipients; a set of authorized usages (described below); a set of allowed formats; a set of allowed channels, and a required action.

In a preferred embodiment of the present invention, the policy comprises distribution regulation, applied for the various electronic distribution channels, for regulating at least one of the following actions:

Sending the digital item via email;
Sending the digital item via web mail;
Uploading the digital item to a web server;
Uploading the digital item to a FTP server;
Sending the digital item via a file transfer application;
Sending the digital item via an instant messaging application;
Sending the digital item via a file transfer protocol; and
Sending the digital item via an instant messaging protocol.

In a preferred embodiment of the present invention, the usage defined by the security policy comprises one or more of the following:

Storage (e.g., in a local hard disk)
Copying a file or an excerpt;
Editing;
Copying to clipboard;
Copying an excerpt to clipboard;
Changing format (e.g., changing the format of a textual document to PDF);
Changing encoding (e.g., from ASCII to Unicode);
Encryption and/or decryption;
Changing digital rights management;
Opening by an application (e.g., by a word processor);
Renaming a file.
Printing.

In a preferred embodiment of the present invention the required action defined by the security policy comprises one or more of the following:

Preventing distribution of the digital item;
Preventing storage of the digital item;
Preventing usage of the digital item, such as editing, copying, printing etc.;
Reporting, such as:
    Reporting distribution of the digital item;
    Reporting storage of the digital item;
    Reporting usage of the digital item;
Alerting, such as:
    Alerting about distribution of the digital item;
    Alerting about storage of the digital item;
    Alerting about usage of the digital item;
    Alerting an administrator, such as a system administrator;
    Alerting a manager, such as the manager of the group in which the breach happened;
    Alerting a recipient;
    Alerting a sender;
    Alerting an owner of the digital item;

Logging, such as:
    logging distribution of the digital item;
    logging storage of the digital item;
    logging usage of the digital item;
Notifying, such as;
    Notifying about distribution of the digital item;
    Notifying about storage of the digital item;
    Notifying about usage of the digital item;
    Notifying to an administrator;
    Notifying to a manager;
    Notifying to a recipient;
    Notifying to a sender;
    Notifying to an owner of the digital item;
Put the digital item in quarantine, until a final decision is taken by an authorized person.
Reporting:
    Reporting to an administrator, such as a system administrator;
    Reporting to a relevant manager;
    Reporting to a recipient;
    Reporting to a sender;
    Reporting to an owner of the digital item;
Encrypting the digital item;
Changing the digital item;
Replacing some information object within the digital data item;
Utilizing digital rights management technology on the digital item.

In a preferred embodiment of the present invention, at least some of these actions are performed utilizing methods such as those disclosed in applicant's co-pending PCT patent application PCT/IL03/00889, U.S. Patent Application No. 20020129140, U.S. application Ser. No. 10/357,201, and provisional patent application 60/437,031, the contents of which are hereby incorporated by reference. Furthermore, as explained in applicant's co-pending PCT patent application PCT/IL03/00889, the contents of which is hereby incorporated by reference, the policy can be dependent on many parameters, such as:
    The identity of a user;
    The identity of a user requesting an action;
    The identity of a user involved in an action;
    The identity of a user receiving a digital item;
    Authentication level of a system;
    Authentication level of a user;
    Authentication level of a user requesting an action;
    Authentication level of a user authorizing an action;
    Authentication level of a user involved in an action;
    Authentication level of a user receiving the digital item;
    Authentication level of a user sending the digital item;
    The format of an digital item instance;
    An interface being used;
    An application being used;
    Encryption being used;
    Digital rights management technology being used;
    Detection of transformation, wherein the transformation is operable to reduce ability to identify the transformed digital item;
    The digital item integrity;
    Regular usage pattern;
    Regular distribution pattern;
    Regular storage pattern;
    Information path;
    Consistency of an action with a usage pattern;
    The identity of a user overriding policy and authorizing action in respect of the digital item;
    Authentication level of a user overriding policy and authorizing action in respect thereof the digital item;
    The identity of a user sending a digital item;
    Information property of a digital item;
    Language of the digital item;
    Representation of the digital item;
    Operations done on the digital item;
    Identity of users involved along the life cycle of the digital item;
    Application used on of a digital item;
    Transition channel of a digital item;
    Participant agents;
    Virtual location of a computer;
    Logical location of a computer;
    Physical location of a computer;
    The domain of a respective digital item;
    The identity of a system;
    Type of a computer;
    Type of a laptop computer;
    Type of a desktop computer;
    Type of a server computer; and
    The owner identity.

In a preferred embodiment of the present invention the policy comprises placing a substantially imperceptible marking in the digital item, comprising information content, and the method comprising placing the marking, when indicated by the policy, before allowing one or more of the following: storage of the digital item; usage of the digital item; and distribution of the digital item, as explained, e.g., in applicant's co-pending PCT patent application PCT/IL03/00889, the content of which is hereby incorporated by reference.

In a preferred embodiment of the present invention, assurance method is also utilized to mitigate email Spam and messages sent by worms, e.g., by determining the integrity of the message and its distribution policy.

It is appreciated that one or more steps of any of the methods described herein may be implemented in a different order than that shown, while not departing from the spirit and scope of the invention.

While the methods and apparatus disclosed herein may or may not have been described with reference to specific hardware or software, the methods and apparatus have been described in a manner sufficient to enable persons of ordinary skill in art to readily adapt commercially available hardware and software as may be needed to reduce any of the embodiments of the present invention to practice without undue experimentation and using conventional techniques.

A number of features have been shown in various combinations in above embodiments. The skilled person will appreciate that above combinations are not exhaustive, and all reasonable combinations of above features are hereby included in the present disclosure.

While the present invention has been described with reference to a few specific embodiments, the description is intended to be illustrative of the invention as a whole and is not to be construed as limiting the invention to the embodiments shown. It is appreciated that various modifications may occur to those skilled in art that, while not specifically shown herein, are nevertheless within the true spirit and scope of the invention.

What is claimed is:

1. A method for providing multi-domain control over a digital data item via a first domain data item specific security policy assigned to said digital data item at a first domain, said digital data item being transferred from said first domain to a second domain, said second domain being autonomous from said first domain in respect of security policies, the method comprising:
- assigning a digital data item specific security policy to said digital data item within said first domain, said digital data item specific security policy being applied in accordance with a first domain security policy operational within said first domain;
- transferring said digital items to said second domain together with additional data defining said digital data item specific first domain security policy, said second domain having a second domain security policy operational within said second domain, said first and second domain security policies being autonomously defined;
- analyzing said first digital data item specific first domain security policy within said second domain in respect of said digital data item; and
- performing at least one of distributing and allowing usage of said digital item within said second domain in accordance with said analyzed digital data item specific first domain security policy, so as to provide control of said digital data item in said autonomous second domain in accordance with said digital data item specific security policy of said first domain.

2. A method according to claim 1 wherein said analyzing said policy comprises assurance of the integrity of the policy and the content.

3. A method according to claim 1, wherein assigning said first domain security policy to said digital item within said first domain comprises determining a legitimacy of at least one of the following:
- a set of authorized recipients;
- a set of authorized usages;
- a set of allowed formats;
- a set of allowed distribution channels, and
- a required action.

4. A method according to claim 3, wherein said required action comprises at least one of the following:
- preventing distribution of said digital item;
- preventing storage of said digital item;
- preventing usage of said digital item;
- reporting distribution of said digital item;
- reporting storage of said digital item;
- reporting usage of said digital item;
- reporting;
- alerting about distribution of said digital item;
- alerting storage of said digital item;
- alerting usage of said digital item;
- alerting;
- logging distribution of said digital item;
- logging storage of said digital item;
- logging usage of said digital item;
- logging;
- notifying about distribution of said digital item;
- notifying about storage of said digital item;
- notifying about usage of said digital item;
- notifying;
- notifying to an administrator;
- notifying to a manager;
- notifying to a recipient;
- notifying to a sender;
- notifying to an owner of said digital item;
- quarantine;
- alerting an administrator;
- alerting a manager;
- alerting a recipient;
- alerting a sender;
- alerting an owner of said digital item;
- reporting to an administrator;
- reporting to a manager;
- reporting to a recipient;
- reporting to a sender;
- reporting to an owner of said digital item;
- encrypting said digital item;
- changing said digital item;
- replacing an information object with said digital data item; and
- utilizing digital rights management technology on said digital item.

5. A method according to claim 3, wherein applying said required action comprises blocking the transmission of the respective item to unauthorized recipients.

6. A method according to claim 1 further comprising sending to said first domain a notification regarding the distribution of said digital item within said second domain.

7. A method according to claim 1, wherein said analyzing said digital data item specific policy within said second domain comprises comparing said digital data item specific policy assigned to said digital item within said first domain to said second domain security policy, so as to obtain a resulting policy for application to said digital item within said second domain.

8. A method according to claim 7, wherein applying said resulting policy within said second domain comprises controlling at least one of a distribution of said item and a usage of said item.

9. A method according to claim 1 further comprising assigning said first domain digital data item specific policy based on information content of said digital item.

10. A method according to claim 8 further comprising monitoring at least one of the distribution and usage of the information content of said digital item within said second domain.

11. A method according to claim 8 further comprising enforcing a at least one of a distribution and a usage policy on the information content of said digital item within said second domain.

12. A method according to claim 11, wherein said enforcing a distribution policy on the information content of said digital item within said second domain comprises enforcing a distribution policy with respect to said second domain email traffic.

13. A method according to claim 7, further comprising providing a negotiation stage of negotiating between said first domain and said second domain in case said first domain security policy assigned to said digital item at said first domain does not comply with policy rules that apply within said second domain.

14. A method according to claim 1, further comprising reporting of attempts of breaches of any of said policies.

15. A method according to claim 1, further comprising utilizing an arbitrator for resolutions of conflicts, said arbitrator being independent of both said first domain and said second domain.

16. A method according to claim 15, wherein said arbitrator utilizes accumulated results of similar negotiations from the same or similar organizations as precedents and resolves said conflicts based on such precedents.

17. A method according to claim 1, further comprising utilizing an assurance authority for assuring the execution of said distribution policy, said assurance authority being independent of said first domain and said second domain and comprising assurance functionality to render trust at both said first and said second domain.

18. A method according to claim 17, wherein said assurance functionality establishes trust between said first and second domain using a shared secret.

19. A method according to claim 17, wherein the trust between said first and second domain is established using public-key infrastructure.

20. A method according to claim 1, further comprising utilizing a trustee for auditing compliance of said second domain with said first domain security policy at said first domain.

21. A method for providing multi-domain monitoring over a digital data item, said data item being transferred from said first domain to a second domain, said second domain being autonomous from said first domain in respect of security policies, the method comprising:
   assigning a digital data item specific security policy to said digital data item within said first domain, said digital data item specific security policy being able to comprise digital data item specific requirements for breach reports, said digital data item specific security policy being applied in accordance with a first domain security policy operational within said first domain;
   transferring said digital data item having said respective digital data item specific first security policy to said second domain, said second domain having a second domain security policy operational within said second domain, said first and second domain security policies being autonomously defined, said transferring being together with additional data defining said respective digital data item specific first domain security policy;
   analyzing said digital data item specific first domain security policy within said autonomous second domain; and
   reporting about breaches or breach attempts within said autonomous second domain in accordance with said analyzed digital data item specific first domain security policy and said breach report requirements.

22. A method according to claim 21, wherein, in a case in which said second domain does not accept a breach reporting requirement of said first domain, at least one of distribution and usage of said digital item within said second domain is prohibited.

23. A method according to claim 21, wherein in a case in which said second domain does not accept said a policy of said first domain, at least one of said distribution and usage of said digital item within said second domain is restricted.

24. A method according to claim 23, wherein said usage comprises at least one of the following:
   Storage;
   Copying a file;
   copying an excerpt;
   editing;
   copying to clipboard;
   copying an excerpt to clipboard;
   changing format;
   changing encoding;
   renaming a file;
   encryption;
   decryption;
   changing digital management;
   opening by an application; and
   printing.

25. A method according to claim 7, wherein, in a case in which said second domain does not accept said policy of said first domain, said distribution or usage of said digital within said second domain is prohibited.

26. A method according to claim 7, wherein in case in which said second domain does not accept said a policy of said first domain, said distribution or usage of said digital item within said second domain is restricted.

27. A method according to claim 3 wherein said usage comprise comprises at least one of the following: Storage; Copying a file; copying an excerpt; editing; copying to clipboard; copying an excerpt to clipboard; changing format; changing encoding; renaming a file; encryption; decryption; changing digital management; opening by an application; and printing.

28. A method according to claim 7, wherein said policy comprises placing a substantially imperceptible marking in said digital item, said marking comprising information content, and said method further comprising placing said marking, when indicated by said policy, before allowing at least one of the following: storage of said digital item; usage of said digital item; and distribution of said digital item.

29. A method according to claim 1, wherein said policy comprises distribution regulation, said distribution regulation being for regulating at least one of the following:
   sending said digital item via mail;
   sending said digital item via web mail;
   uploading said digital item to a web server;
   uploading said digital item to a FTP server;
   sending said digital item via a file transfer application;
   sending said digital item via an instant messaging application;
   sending said digital item via a file transfer protocol; and
   sending said digital item via an instant messaging protocol.

30. A method according to claim 1, wherein said policy is dependent on at least one of the following:
   the domain of a respective digital item;
   the identity of a system;
   the identity of a user;
   the identity level of a user authorizing an action;
   the identity of a user requesting an action;
   the identity of a user involved in an action;
   the identity of a user receiving an digital item;
   authentication level of a system;
   authentication level of a user;
   authentication level of a user requesting an action;
   authentication level of a user authorizing an action;
   authentication level of a user involved in an action;
   authentication level of a user receiving said digital item;
   authentication level of a user sending said digital item;
   the format of an digital item instance;
   an interface being used;
   an application being used;
   encryption being used;
   digital rights management technology being used;
   detection of transformation, wherein said transformation is operable to reduce ability to identify said transformed digital item;
   digital item integrity;
   regular usage pattern;
   regular distribution pattern;
   regular storage pattern;
   information path;
   consistency of an action with usage pattern;
   the identity of a user overriding policy and authorizing action in respect to said digital item;
   authentication level of a user overriding policy and authorizing action in respect to said digital item;
   the identity of a user sending digital item;
   information property of said digital item;
   language of said digital item;
   representation of said digital item;
   operations done on of said digital item;

identity of users involved along the life cycle of said digital item;
application used on of said digital item;
transition channel of said digital item;
participant agents;
virtual location of a computer;
logical location of a computer;
physical location of a computer;
type of a computer;
type of a laptop computer;
type of a desktop computer;
type of a server computer; and
owner identity.

31. A method according to claim 1, wherein said analyzing comprises modifying said first domain security policy to encompass security policy rules of said second domain.

32. Apparatus for providing multi-domain control over specific digital data items via a digital data item specific first domain security policy assigned to a respective digital data item at a first domain, said data item being transferred from said first domain to a second domain, said second domain being autonomous from said first domain in respect of security policies, apparatus comprising:
a policy reference monitor, configured for assigning a digital data item specific security policy to a digital item within said first domain, said digital data item specific security policy being applied in accordance with a first domain security policy operational within said first domain; and
an assurance reference monitor configured for:
receiving said digital data items sent to said second domain together with data defining respective digital data item specific first domain security policy, said second domain having a second domain security policy operational within said second domain, said first and second domain security policies being autonomously defined;
analyzing said data defining said respective digital data item specific first domain security policy,
performing at least one of distributing and allowing usage of said digital items within said second domain in accordance with said analyzed digital data item specific first domain security policy, and
communicating with said policy reference monitor.

33. Apparatus according to claim 32, further comprising an intra-organization reference monitor associated with said intra-organization reference monitor, and configured for checking whether said security policy assigned to said digital item complies with the policy applied within said second domain.

34. Apparatus according to claim 32, further comprising an audit database configured for recording details of events in which a digital item, to which a distribution policy was assigned, was received by said assurance reference monitor.

35. Apparatus according to claim 32, further comprising an identification module, said identification module is operable to identify the information content of said digital item received by said assurance reference monitor.

36. Apparatus according to claim 32, further comprising an arbitrator, said arbitrator being operable to resolve conflicts between said assigned policy and the policy applied within said second domain.

37. Apparatus according to claim 32, further comprising an assurance entity, said assurance entity being operable to assures or certify the execution of said security policy assigned to said digital item.

38. A method for providing multi-domain control over a digital data item via a first domain security policy assigned to said digital data item at a first domain, said data item being transferred from said first domain to a second domain, said second domain being autonomous from said first domain in respect of security policies, the method comprising:
assigning said security policy to said digital item within said first domain, wherein said first domain security policy is operational within the perimeter of a source organization;
transferring said digital items to said second domain together with data defining said first domain security policy;
analyzing said first domain security policy within said second domain, wherein said second domain is operational within the perimeter of a recipient organization, said first and second domain security policies being autonomously defined by said source and said recipient organizations respectively;
performing at least one of distributing and allowing usage of said digital items within said second domain in accordance with said analyzed first domain security policy; and
utilizing an arbitrator for resolutions of conflicts, said arbitrator being independent of both said first domain and said second domain, wherein said arbitrator utilizes accumulated results of similar negotiations from the same or similar organizations as precedents and resolves said conflicts based on such precedents.

39. A method for providing multi-domain control over a digital data item via a first domain security policy assigned to said digital data item at a first domain, said data item being transferred from said first domain to a second domain, said second domain being autonomous from said first domain in respect of security policies, the method comprising:
assigning said security policy to said digital item within said first domain, wherein said first domain is operational within the perimeter of a source organization:
transferring said digital items to said second domain together with data defining said first domain security policy, wherein said second domain is operational within the perimeter of a recipient organization, said first and second domain security policies being autonomously defined by said source and said recipient organizations respectively;
analyzing said first domain security policy within said second domain;
performing at least one of distributing and allowing usage of said digital items within said second domain in accordance with said analyzed first domain security policy; and
utilizing an assurance authority for assuring the execution of said distribution policy, said assurance authority being independent of said first domain and said second domain and comprising assurance functionality to render trust at both said first and said second domain.

40. A method for providing multi-domain control over a digital data item via a first domain security policy assigned to said digital data item at a first domain, said digital data item being transferred from said first domain to a second domain, said second domain being autonomous from said first domain in respect of security policies, the method comprising:
assigning said security policy to said digital item within said first domain, wherein said first domain is operational within the perimeter of a source organization;
transferring said digital items to said second domain together with data defining said first domain security policy, wherein said second domain is operational within the perimeter of a recipient organization, said first and second domain security policies being autonomously defined by said source and said recipient organizations respectively;

analyzing said first domain security policy within said second domain;

performing at least one of distributing and allowing usage of said digital items within said second domain in accordance with said analyzed first domain security policy; and utilizing a trustee for auditing compliance of said second domain with said first domain security policy at said first domain.

41. A method according to claim 1, wherein said data item is transferred from a source organization to a recipient organization, said first security policy and said second security policy being autonomously defined by said source and recipient organizations respectively and applied within the perimeter of said source and recipient organizations respectively.

42. A method according to claim 21, wherein said data item is transferred from a source organization to a recipient organization, said first security policy and said second security policy being autonomously defined by said source and recipient organizations respectively and applied within the perimeter of said source and recipient organizations respectively.

43. A method according to claim 32, wherein said data item is transferred from a source organization to a recipient organization, said first security policy and said second security policy being autonomously defined by said source and recipient organizations respectively and applied within the perimeter of said source and recipient organizations respectively.

44. A method according to claim 1, wherein said digital data item comprises one of: a document, a digital audio file, a digital video file, a digital image and a drawing.

45. A method according to claim 21, wherein said digital data item comprises one of: a document, a digital audio file, a digital video file, a digital image and a drawing.

46. A method according to claim 32, wherein said digital data item comprises one of: a document, a digital audio file, a digital video file, a digital image and a drawing.

47. A method for providing multi-domain control over a digital data item via a first domain digital data item specific security policy assigned to said digital data item at a first domain, said digital data item being transferred from said first domain to a second domain, the method comprising:

assigning said digital data item specific security policy to said digital data item within said first domain;

transferring said digital data item to said second domain together with additional data defining said digital data item specific first domain security policy, said second domain being autonomous from said first domain in respect of security policies;

analyzing said digital data item specific first domain security policy within said second domain in respect of said digital data item; and performing at least one of distributing and allowing usage of said digital item within said autonomous second domain in accordance with said analyzed digital data item specific first domain security policy, so as to provide control of said digital data item in said autonomous second domain in accordance with said digital data item specific security policy of said first domain, and wherein said digital data item comprises one of: a document, a digital audio file, a digital video file, a digital image and a drawing.

48. Apparatus for providing multi-domain control over specific digital data items via a digital data item specific first domain security policy assigned to a respective digital data item at a first domain, said digital data item being transferred from said first domain to a second domain, said second domain being autonomous from said first domain in respect of security policies, comprising:

a policy reference monitor, configured for assigning said digital data item specific security policy to said digital item within said first domain; and an assurance reference monitor configured for:

receiving said digital items sent to said second domain together with data defining respective digital data item specific first domain security policy;

analyzing said data defining said respective digital data item specific first domain security policy, performing at least one of distributing and allowing usage of said digital items within said second domain in accordance with said analyzed digital data item specific first domain security policy, and communicating with said policy reference monitor, and wherein said digital data item comprises one of: a document, a digital audio file, a digital video file, a digital image and a drawing.

* * * * *